Sept. 27, 1949.    F. A. OLSON    2,483,150
INDICATOR DEVICE
Filed March 3, 1948

Inventor:
Frederick A. Olson,
by Merton D. Moore
His Attorney.

Patented Sept. 27, 1949

2,483,150

UNITED STATES PATENT OFFICE 2,483,150

INDICATOR DEVICE

Frederick A. Olson, Syracuse, N. Y., assignor to General Electric Company, a corporation of New York Application March 3, 1948, Serial No. 12,869

2 Claims. (Cl. 116—124.2)

1

This invention relates to mechanical indicator devices, and more particularly to such devices for use in mechanical and electrical apparatus and the like, for indicating preferred settings of control units associated with such apparatus.

It is often desirable in radio apparatus and the like, for example, in an amplifier system, to operate the system at two or three preferred amplification levels. It is, therefore, an object of this invention to provide an indicating device whereby the amplifier system may be quickly and conveniently set to any desired one of the two or three preferred levels.

It is a further object of this invention to provide such an indicating device that may be used in the above-described system, and other types of mechanical and electrical apparatus, in which certain preferred settings of any control unit associated with the apparatus are set up manually by pointers mounted on a hub, and the control unit set to any desired one of the preferred settings by merely rotating an indicating knob, mounted on the shaft of the control unit, until the knob is aligned with the pointer indicating the desired one of the preferred settings.

A further object of this invention is to provide such an indicating device, wherein any of the pointers may be manually shifted as a new set of conditions calls for new preferred positions of the control unit.

Yet another object of this invention is to provide such an indicating device mounted on a hub concentric to the shaft of a control unit, which does not require any disfiguring marking or cutting of the panel upon which the device is mounted.

The features of this invention which are believed to be new are set forth with particularly in the appended claims. The invention itself, however, together with further objects and advantages thereof may best be understood by reference to the following description when taken in conjunction with the accompanying drawing in which, Fig. 1 shows a front view of the proposed indicator device, Fig. 2 shows an exploded perspective view of the device, and Fig. 3 shows a sectional view thereof.

Figure 1:
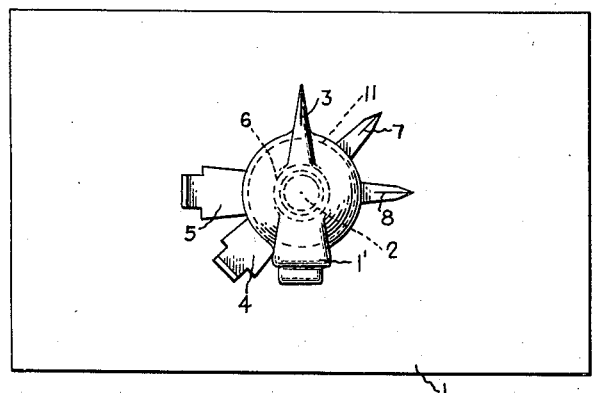

Referring now to Fig. 1, the proposed indicating device is shown as being mounted on a panel 1 of an amplifier system, electrical or mechanical apparatus, or the like. Indicator knob 1' is fixedly mounted on a shaft 2, shaft 2 being coupled to a control unit associated with the apparatus. The angular position of shaft 2, and hence, the setting of the control unit, is indicated by a scribed line 3 formed in knob 1', as shown.

Pointers 4 and 5 are rotatably mounted on a hub 6, these pointers being frictionally engaged in the indicating device, and capable of individual, manual rotation to indicate preferred settings of the control unit. Pointers 4 and 5 and knob 1' are so constructed that one nests within the other. The pointers may be rotated through 360° and the rotation of the knob is restricted only by the limit of adjustment of the control unit. The pointers 4 and 5 have scribed lines 7 and 8 respectively formed therein, and when these pointers have been manually set to indicate preferred settings of the control unit, these settings may be set up merely by aligning the scribed line 3 of knob 1' with either the scribed line 7, or the scribed line 8, as so desired. When a new set of conditions calls for new preferred settings of the control unit, pointers 4 and 5 may be simply, manually shifted to indicate these new preferred settings. Although two pointers 4 and 5 have been shown, the invention contemplates using as many pointers as required, dependent upon the number of preferred positions of the control unit that the indicator device is required to set up.

Figure 2:
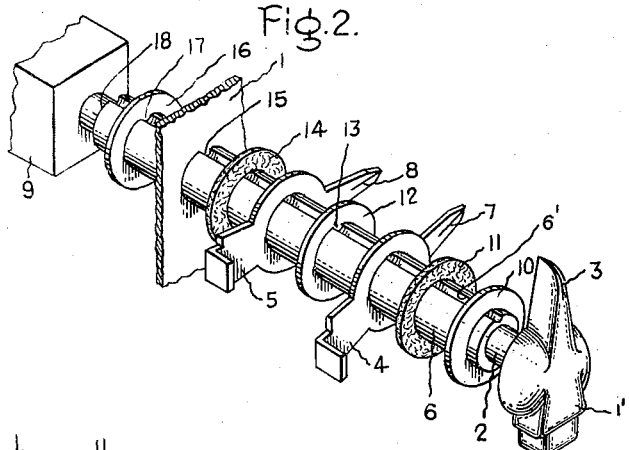
Figure 3:
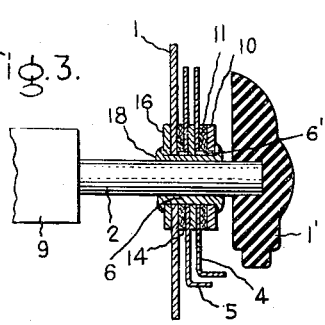

Referring now to Fig. 2, the indicating device is shown therein in perspective exploded form. Knob 1' is fixed to control shaft 2, and rotation of this knob changes the setting of a control unit 9. Hub 6 is mounted concentric to shaft 2, and this hub has a keyway 6' extending longitudinally along its length. A washer 10 is mounted at one extremity of hub 6, and this washer may be either integral with the hub, or the hub may be staked or spun thereto. A felt washer 11 is mounted next to washer 10, as shown, and acts as a spring to prevent pointers 4 and 5 from turning due to vibration. Pointers 4 and 5 are rotatably mounted on hub 6, and these pointers have a washer 12 mounted therebetween to prevent the torque of one from affecting the other, washer 12 being keyed to hub 6 by means of key 13. A further felt washer 14 is mounted between pointer 5 and panel 1, and serves a purpose similar to that of washer 11. Panel 1 is keyed to hub 6 by means of key 15, thereby preventing rotation of the hub. A further washer 16, keyed to hub 6 by means of key 17 is mounted on the rear side of panel 1, and serves to secure the indicating assembly, the end of hub 6, shown as 18, being spun or staked to this washer.

Referring to Fig. 3, a sectional view of the indicator device is shown herein, and it can be seen that the ends of hub 6 have been spun to washers 10 and 16, thus securing the assembly. Pointers 4 and 5 are frictionally engaged in the indicating device by felt washers 11 and 14, and the pointers may be rotated about the hub 6.

This invention therefore provides a compact indicator assembly, simple and inexpensive to construct, and which may be used in any mechanical or electrical apparatus in which it is desired to indicate a plurality of preferred settings of control units associated with such apparatus, and whereby the indication is accomplished in a restricted area.

While a certain specific embodiment has been shown and described, it will of course be understood that various modifications may be made without departing from the invention. The appended claims are therefore intended to cover any such modifications as fall within the true spirit and scope of the invention.

What I claim as new and desire to secure by Letters Patent of the United States is:

1. An indicator assembly, comprising a hub member; a plurality of indicating members mounted thereon and free to rotate thereabout, a plurality of further members rigidly mounted on said hub member, one of said further members being placed intermediate respective ones of said indicating members for preventing the transmission of motion therebetween, means for securing said assembly so that said indicating members are frictionally engaged therein, and means whereby said indicating members may be individually rotated to desired angular positions.

2. An indicator assembly comprising, a control unit, a shaft coupled to said unit, an indicator knob member fixed to said shaft, a panel, a hub fixed to said panel and mounted concentrically to said shaft, said hub having a plurality of indicator members rotatably mounted thereon, a plurality of disk like members fixed to said hub, at least one of said disk like members separating each pair of said indicator members, means for securing said assembly so that said indicator members are frictionally engaged therein, manual means whereby said indicator members may be individually rotated to indicate desired settings of said control unit, and manual means whereby said indicator knob member may be aligned with respective ones of said indicator members to impart desired settings to said control unit.

FREDERICK A. OLSON.

REFERENCES CITED

The following references are of record in the file of this patent:

UNITED STATES PATENTS

| Number | Name | Date |
|---|---|---|
| 867,323 | Wardin | Oct. 1, 1907 |
| 1,397,547 | Reeves | Nov. 22, 1921 |
| 2,364,127 | Capon | Dec. 5, 1944 |